United States Patent [19]
Freitag

[11] Patent Number: 5,813,124
[45] Date of Patent: Sep. 29, 1998

[54] ANGLE MEASURING DEVICE

[75] Inventor: Holger Freitag, Bochum, Germany

[73] Assignee: Mannesmann Aktiengesellschaft, Düsseldorf, Germany

[21] Appl. No.: 627,917

[22] Filed: Apr. 2, 1996

Related U.S. Application Data

[63] Continuation of Ser. No. 400,957, Mar. 7, 1995, abandoned.

[30] Foreign Application Priority Data

Mar. 7, 1994 [DE] Germany ............ 44 08 056.5

[51] Int. Cl.⁶ ..................................... G01B 7/30
[52] U.S. Cl. .................. 33/1 N; 33/1 PT; 33/534; 33/538
[58] Field of Search ............... 33/1 N, 1 PT, 33/534, 538, DIG. 1

[56] References Cited

U.S. PATENT DOCUMENTS

| | | |
|---|---|---|
| 3,128,554 | 4/1964 | Borden ........................... 33/1 N |
| 3,829,981 | 8/1974 | Vlasblom ......................... 33/312 |
| 4,103,842 | 8/1978 | Martin et al. . |

FOREIGN PATENT DOCUMENTS

| | | |
|---|---|---|
| 549855 | 7/1993 | European Pat. Off. . |
| 2316977 | 2/1977 | France . |
| 3341994 | 5/1985 | Germany . |
| 4141000 | 6/1992 | Germany ........................ 33/1 N |
| 151508 | 8/1985 | Japan .............................. 33/1 N |
| 1237903 | 6/1986 | U.S.S.R. ......................... 33/1 N |
| 2229006 | 9/1990 | United Kingdom . |

*Primary Examiner*—Christopher W. Fulton
*Attorney, Agent, or Firm*—Cohen, Pontani, Lieberman & Pavane

[57] ABSTRACT

An angle measuring device used for measuring the pendulum angle of a cable of a lifting device comprising connection components which utilize measurement value pick-ups and are connected via a cardanic-type joint to axles which are arranged at right angles to one another. To attain high precision of discrimination in measurement, the measurement value pick-ups each comprises a Hall sensor and an associated magnetic element to create a magnetic field detectable by the Hall sensor. An angle of measurement can be attained if the lower connection component is swung and causes a shift in the joint ball around the axle. This results in a change in the position of the magnets relative to the Hall sensors. This change in position results in a change in the detected Hall voltage which after appropriate adjustment can be transformed into an angle measurement.

4 Claims, 1 Drawing Sheet

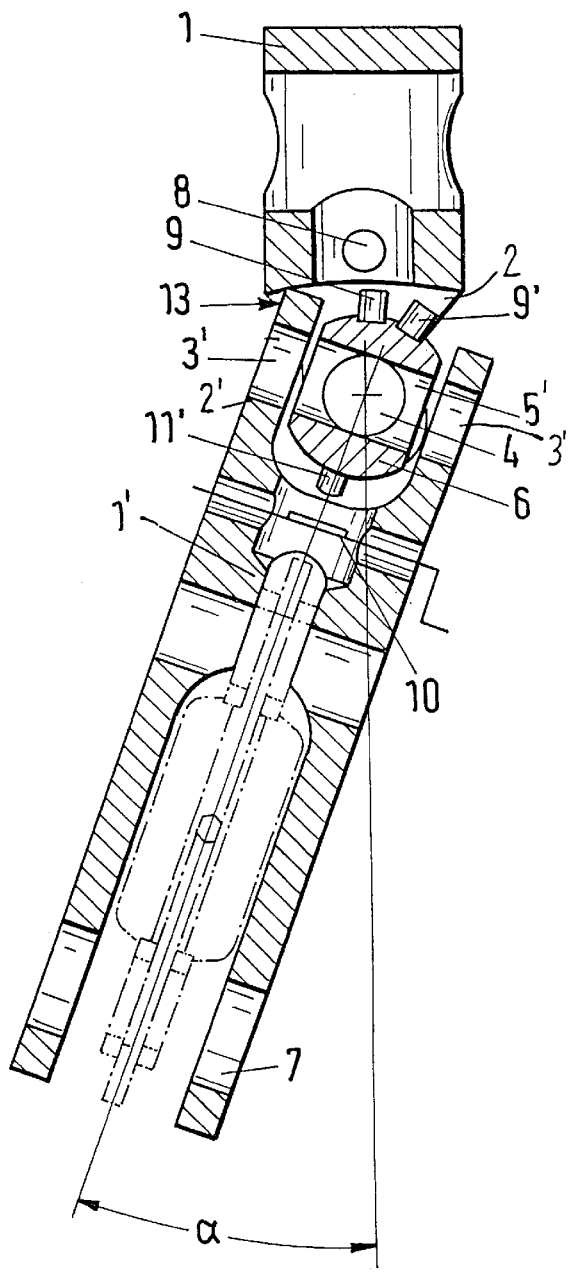
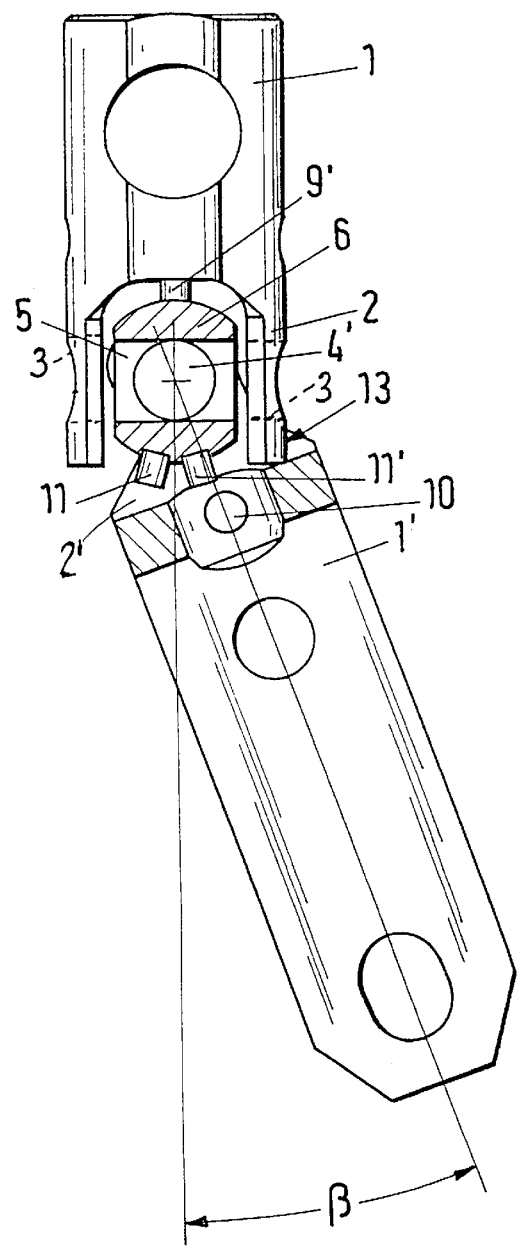

ANGLE MEASURING DEVICE

This is a continuation, of application Ser. No. 08/400,957, filed Mar. 7, 1995, now abandoned.

BACKGROUND OF THE INVENTION

1. Field of the Invention

The present invention relates to a device for measuring angles, and more particularly, to an angle measuring device of simple and compact structure for measuring the pendulum angle of a cable of a lifting device, such angle measuring device allowing good precision of discrimination.

2. Description of the Prior Art

A precise determination of the measurement of a pendulum angle of a lifting device is essential to facilitate the raising of heavy objects. A simple pendulum is an idealized body consisting of a point mass suspended by an inextensible cord, generally a string or a cable. If the object is displaced from its equilibrium position the angle of displacement is known as the pendulum swing angle. Without a determination of the pendulum swing angle, undue effort may be wasted in raising the object. Furthermore, a precise determination of the pendulum swing angle eliminates the possibility of breakage of the lifting cable which can cause serious injuries and property damage.

A measuring device for determining the pendulum angle of a cable of a lifting device is known from German Patent DE-40 32 332 A1. This measuring device which comprises a cardanic-type joint with axles arranged at right angles to one another has measurement value pick-ups arranged between the lifting device and the cable, which detect the movement of the axles. The measurement value pick-ups are designed as swing angle transmitters and are connected by their measurement shaft to the axle of the joint for the purpose of directly picking up the swing movement of the axles. Use of the swing angle transmitters allows this measuring device to achieve adequate precision of discrimination. However, the connection of the swing angle transmitter to the axles of the cardanic-type joint proves to be very complicated mechanically. Furthermore, the swing angle transmitter must have adequate structural space outside of the joint in order to function optimally. Additionally, the swing angle transmitter does not provide an absolute measurement signal.

German Patent Application DE-OS 17 56 441 discloses a pendulum balance regulator for a load hanging on the trolley of a crane. The pendulum angle required by the regulator is determined by the use of inductive pick-ups which are arranged in front of and behind the cable of the crane and are aligned with the trolley causing the pick-ups to move in the direction of the trolley in simultaneous fashion. As the inductive pick-ups move along the cable with the trolley, an air gap is maintained. As a result of the start up or braking of the trolley, the pendulum swing of the cable changes the distances between such cable and the inductive pick-ups. This change induces an electric current in the pick-ups which is proportional to the swing of the cable. This device proves, however, to be disadvantageous because the precision of discrimination is very low and because the spatial swing of the cable is not taken into account. Moreover, a large installation space is needed.

Therefore, it is an object of the present invention to rectify the disadvantages of these prior art devices by creating an angle measuring device having a compact and simple structure, and which, at the same time, permits good precision of discrimination.

SUMMARY OF THE INVENTION

The present invention is directed to a device for measuring the pendulum angle of a cable of a lifting device that satisfies the need for a device of compact and simple design as well as the need for a device capable of obtaining a high precision of discrimination.

In order to create a compact angle measuring device with a simple design which will operate in a minimal space and which will permit high precision of discrimination, the angle measuring device of the present invention has two connection components which are connected by a cardanic joint to a first and a second axle which are arranged at right angles to one another. In accordance with the present invention, measurement value pick-ups are utilized which detect the movement of the axles of the joint. It is preferred that the respective measurement value pick-ups include a Hall sensor and an associated magnetic element. Hall sensors, which are commercially available and which in the present invention are constructed from a band-like conductor through which current flows, make it possible to determine the field strength and direction of a magnetic field which flows through the Hall sensor. The so-called "Hall effect" is based on the Lorentz force, which causes a load moved orthogonally through a magnetic field to deviate laterally. When the conductor of the Hall sensor is exposed to the aforementioned magnetic field, the moved electrons are deviated to one side. The collection of electrons at one edge of the conductor can be detected in the form of a so-called "Hall voltage" between the edges of the conductor. This Hall voltage is proportional to the magnitude of the magnetic field. The Hall sensor and the associated magnetic element are preferably arranged opposite to one another on the connection components and the axles. Such an arrangement permits movement of the Hall sensor and the associated magnetic element relative to one another and furthermore induces the formation of a magnetic field.

The connection components are each U-shaped with two fork-shaped ends, each of which end has a bore along a common axis. The bore accommodates an axle which is arranged at a right angle relative to a further axle mounted in the bore in the two fork-shaped ends of the other connection component. The axles are arranged in corresponding bores of a joint ball which is made of a ferro-magnetic material. The bores of the joint ball are in turn arranged at a right angle to one another.

Accordingly, a magnetic element is established across from the Hall sensor on the ball of the cardanic joint. The magnetic element is preferably constructed from two cylindrical magnets which are arranged at a distance from one another with opposite poles secured to the joint ball. This arrangement of the cylindrical magnets, in relation with the joint ball, forms a horseshoe magnet having a field in the air gap between the two magnets. This magnetic field can be detected by the associated Hall sensor on the connection component. When the lower connection component is swung, the joint ball is caused to turn around one axle, which leads to a change in position of the cylindrical magnets relative to the associated Hall sensor. This movement results in a change in the detected Hall voltage which, after appropriate adjustment, can be transformed into a measurement of the angle alpha ($\alpha$), which connotes the swinging of the lower connection component within a plane arranged at a right angle to the axle. This swing angle is limited by the forked ends of the connection components. These forked ends protrude only far enough to define a limit for the swing angle. Preferably, the swing angle is limited to a maximum of about twenty (20) degrees.

DETAILED DESCRIPTION OF THE DRAWINGS

An understanding of the present invention will be facilitated by the detailed description of the presently preferred embodiment set forth herein taken together with the annexed drawings, in which:

FIG. 1 is a longitudinal cross-sectional view of the presently preferred embodiment of my invention with certain parts deleted to more clearly illustrate the invention.

FIG. 2 is a view partly in section and partly in plane of the embodiment shown in looking from the left in FIG. 1, with certain parts deleted to more clearly illustrate the invention.

It is to be understood that the drawings are designed solely for purposes of illustration and not as a definition of the limits of the invention, for which reference should be made to the appended claims.

DETAILED DESCRIPTION OF THE PRESENTLY PREFERRED EMBODIMENTS

Referring now to the drawings in detail, there is shown the angle measuring device according to the invention. The device includes an upper and a lower connection components 1 and 1', each having a U-shaped or fork-like design at one end, as can be seen in FIG. 1 with regard to component 1' and in FIG. 2 with regard to component 1. Components 1 and 1' are connected to each other via a cardanic joint. The connection components 1 and 1' are connected, on the one hand, to a lifting device (not shown) and, on the other hand, to the lift cable or to an additional measurement cable which has been stretched. The respective fork ends 2 of connection component 1 are spaced from each other as are the fork ends 2' of connection component 1'. The fork ends 2 and 2' of the connection components 1, 1' protrude to predetermined fixed points 13 so as to define limits for the measurement of the swing angles of the pendulum. In practical terms, the protruding fork ends 2' limit the swing angle connoted as alpha ($\alpha$) on FIG. 1 and the protruding fork ends 2 limit the swing angle Beta ($\beta$) on FIG. 2, to approximately twenty (20) degrees as measured from the vertical.

Extending through the fork ends 2' are aligned bores 3', which serve to accommodate a first axle 4' (FIG. 1). Extending through the aligned bores 3 in fork ends 2 is a second axle 4 which is arranged at a right angle to first axle 4' (FIG. 2). Both the first and the second axles 4 and 4' are in turn arranged in corresponding second bores 5 and 5' of a joint ball 6 which is composed of ferro-magnetic material. The bores 5 and 5' of the joint ball 6 are arranged at right angles to each other. On the end distal from the fork ends 2 of the second said connection components 1' is at least one eyelet opening 7 for use in facilitating the attachment of the angle measuring device to parts not depicted in the figure such as, for example, the lift cable or a measurement cable.

The actual measurement as performed by the invention is carried out by commercially available Hall sensor pick-ups 8, 10, which are arranged within the base of the openings of the fork ends 2 and 2' of said first and said second connection components 1, 1'. The Hall sensors 8 and 10 are constructed from a band-like conductor through which a current flows and permits the determination of the field strength and direction of a magnetic field which flows through the Hall sensor. When this conductor is exposed to a magnetic field, it causes the displacement of electrons which are then deviated in a lateral direction. One magnetic field arises from a magnetic source which is established across from the first Hall sensor 8 on the joint ball 6. This magnetic source is composed of two cylindrical magnets 9 and 9', which are mounted on joint ball 6 so that their exposed ends are of opposite polarity to one another to thereby form a horseshoe magnet having an air gap with a magnetic field therein between the two cylindrical magnets 9, 9'. The magnetic field formed between the two cylindrical magnets 9, 9' is detected by the Hall sensor 8 on the first connection component 1.

In the view illustrated in FIG. 2, there is shown another pair of cylindrical magnets 11, and 11', having the same function as the cylindrical magnets 9 and 9' in FIG. 1. Magnets 11 and 11' are arranged on the joint ball 6 in spaced apart relation and with their exposed ends of opposite polarity to create a second horseshoe magnet to cooperate with Hall sensor 10 to detect the angular movement of the second connection component 1' in the plane lying vertical to the second axle 4'.

In operation, the magnetic field in the air gap formed between the cylindrical magnets 9 and 9' can be detected by the Hall sensor 8 arranged as a part of the first connection component 1. Likewise, the magnetic field in the air gap formed between the cylindrical magnets 11 and 11' can be detected by the Hall sensor 10 arranged as part of the second connection component 1'. For optimal measurement, the Hall sensors should be oriented in a pre-selected zero position between the connection components located central to the cylindrical magnets. If the second connection component 1' is swung as shown in FIG. 2, the joint ball 6 is caused to rotate around the axle 4'. As a result, there is a change in the position of the cylindrical magnets 11, 11' relative to the Hall sensor 10. This change in position of the cylindrical magnets 11, 11' leads to a change in the detected Hall voltage which, after appropriate adjustment, can be transformed into a measure for the angle Beta ($\beta$). The angle Beta refers to the swinging of the lower connection component 1' within a plane arranged at right angle to the axle 4'. Likewise, the angle alpha ($\alpha$) in FIG. 1 is an analogous measurement of the swinging of the lower connection component 1' within a plane arranged at a right angle to axle 4'.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. An angle measuring device, for measuring the pendulum angle of a cable, comprising:

first and second connection components, each connection component having one end configured in a U-shape with spaced apart forked ends and a bore extending through said fork ends, said first and second connection components being located relative to one another so that their respective forked ends are adjacent one another and the bores through said forked ends are at right angles to one another, a joint ball having a pair of bores at right angles to one another and being respectively aligned with said bores in said forked ends of said first and said second connection components;

a first axle and a second axle arranged at right angles to one another, and connected to said first and said second connection components and said joint ball through their respective bores to define a cardanic-type joint such that said first and said second connection components can be moved relative to one another;

first and second measurement value pick-ups, said first measurement value pick-up comprising a first Hall sensor mounted on said first connection component and a first pair of magnetic elements operatively connected to said second connection component in opposite polarity and in spaced apart relation to one another form an air gap in which the magnetic field produced by said first pair of magnetic elements is present, and in confronting relation to said first Hall sensor so that said magnetic field in said first pair of magnetic elements may be detected by said first Hall sensor, said second measurement value pick-up comprising a second Hall sensor mounted on said second connection component and a second pair of magnetic elements operatively connected to said first connection component in opposite polarity and in spaced apart relation to one another to form an air gap in which the magnetic field produced by said second pair of magnetic elements is present, and in confronting relation to said second Hall sensor so that said magnetic field in said air gap between said second pair of magnetic elements may be detected by said second Hall sensor.

2. An angle measuring device, for measuring the pendulum angle of a cable, comprising:

first and second connection components, each connection component having one end configured in a U-shape with spaced apart forked ends and a bore extending through said fork ends said first and second connection components being located relative to one another so that their respective forked ends are adjacent one another and the bores through said forked ends are at right angles to one another, a joint ball having a pair of bores at right angles to one another and being respectively aligned with said bores in said forked ends of said first and said second connection components;

a first axle and a second axle arranged at right angles to one another, and connected to said first and said second connection components and said joint ball through their respective bores to define a cardanic-type joint such that said first and said second connection components, and said first and said second axle can be moved relative to one another;

first and second measurement value pick-ups, said first measurement value pick-up comprising a first Hall sensor mounted on said first connection component and a first pair of magnetic elements mounted on said joint ball in confronting relation with said first Hall sensor, said first pair of magnetic elements being mounted on said joint ball in opposite polarity and in spaced apart relation to form a first air gap in which the magnetic field produced by said first pair of magnetic elements may be detected by said first Hall sensor, and a second measurement value pick-up comprising a second Hall sensor mounted on said second connection component and a second pair of magnetic elements mounted on said joint ball in opposite polarity and in spaced relation to form a second air gap in which the magnetic field produced by said second pair of magnetic elements may be detected by said second Hall sensor.

3. The angle measuring device as recited in claim 2, wherein said joint ball is composed of a ferro-magnetic material.

4. The angle measuring device as recited in claim 3, wherein said magnetic elements are cylindrical, said first and second air gaps are at right angles to said first and said second axles respectively, and wherein said first and said second Hall sensors are oriented in a pre-selected zero position and located centrally between their respective pairs of cylindrical magnets.

* * * * *